United States Patent [19]

Miller, deceased

[11] Patent Number: 4,523,407
[45] Date of Patent: Jun. 18, 1985

[54] HATCH COVER

[75] Inventor: Fred L. B. Miller, deceased, late of Lake Oswego, Oreg., by Dorothy W. Miller, personal representative

[73] Assignee: Dorothy W. Miller, Lake Oswego, Oreg.

[21] Appl. No.: 537,052

[22] Filed: Sep. 23, 1983

[51] Int. Cl.³ .............................................. E05C 21/02
[52] U.S. Cl. ........................................ 49/465; 49/395; 49/400; 404/25
[58] Field of Search ................. 49/465, 463, 466, 395, 49/400; 404/25

[56]  References Cited

U.S. PATENT DOCUMENTS 1,287,290 12/1918 Golden .............................. 49/465 X
2,778,072  1/1957 Palisca .................................... 49/489
3,209,663 10/1965 Baier ................................. 49/400 X
3,920,347 11/1975 Sauriol et al. ......................... 404/25
3,977,124  8/1976 Oger ................................ 49/465 X Primary Examiner—Philip C. Kannan
Attorney, Agent, or Firm—Lee R. Schermerhorn

[57]  ABSTRACT

The hatch cover is secured and locked in place by a spider which is rotatable into locking position against the underside of a deck ring which receives the cover plate. The spider is clamped by a center bolt passing through the cover and the spider. Means are provided on opposite ends of the center bolt for rotating it from either the outside or inside of the cover. The cover is adapted to stow a removable wrench for this purpose recessed in the outside of the cover. A peripheral seal on the cover plate maintains a water tight and air tight joint when the cover is clamped and locked in place while allowing metal to metal contact between the cover and supporting ring when necessary.

12 Claims, 6 Drawing Figures

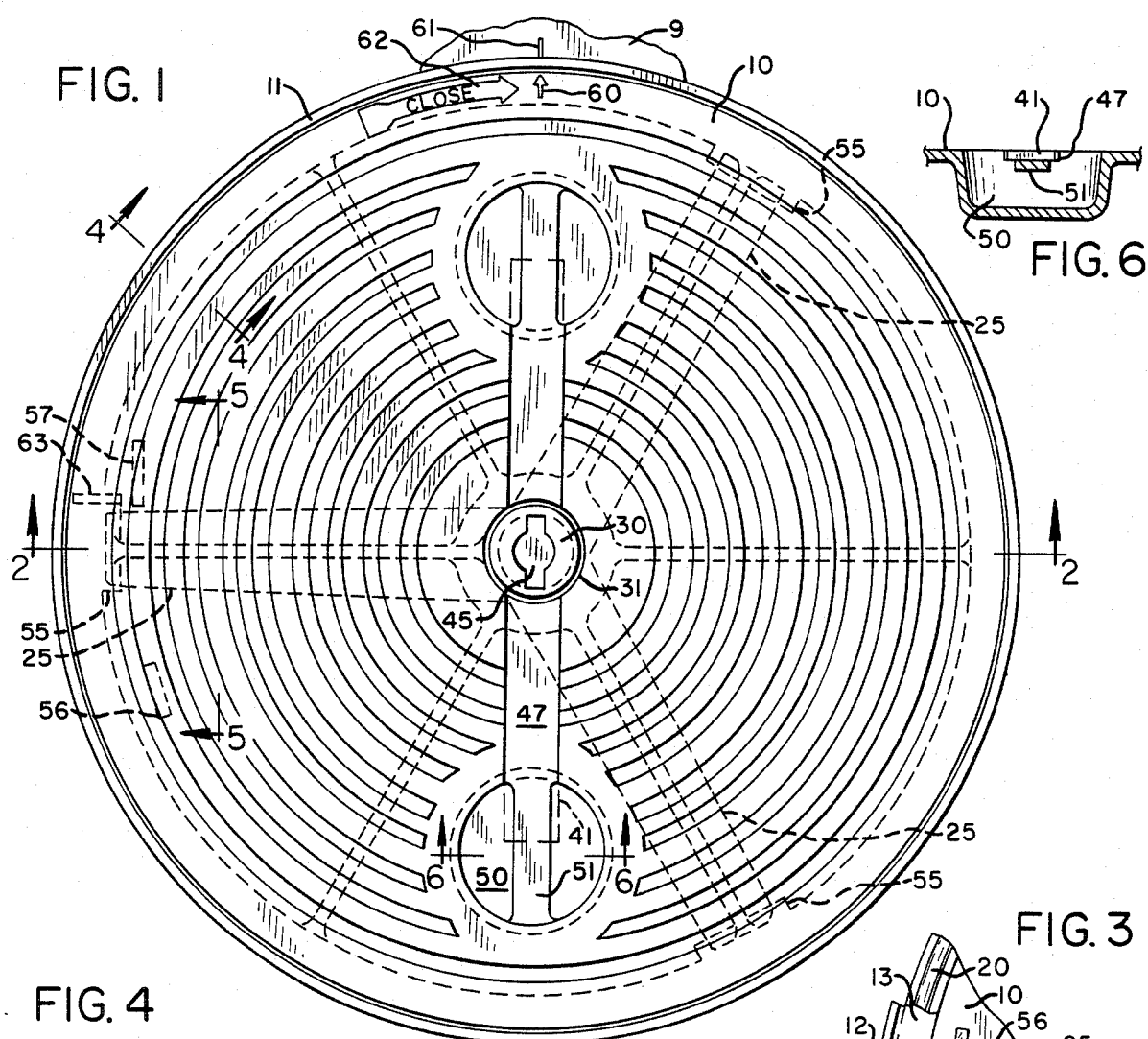
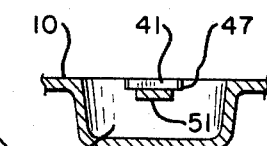
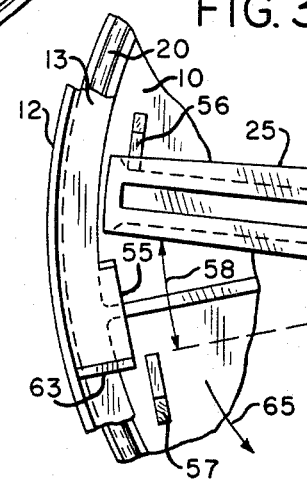
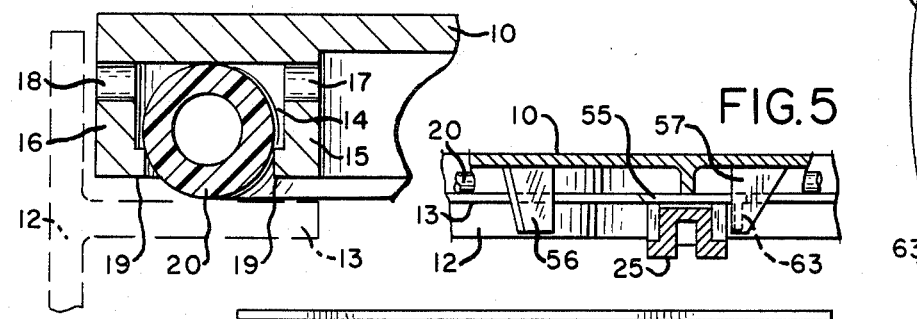
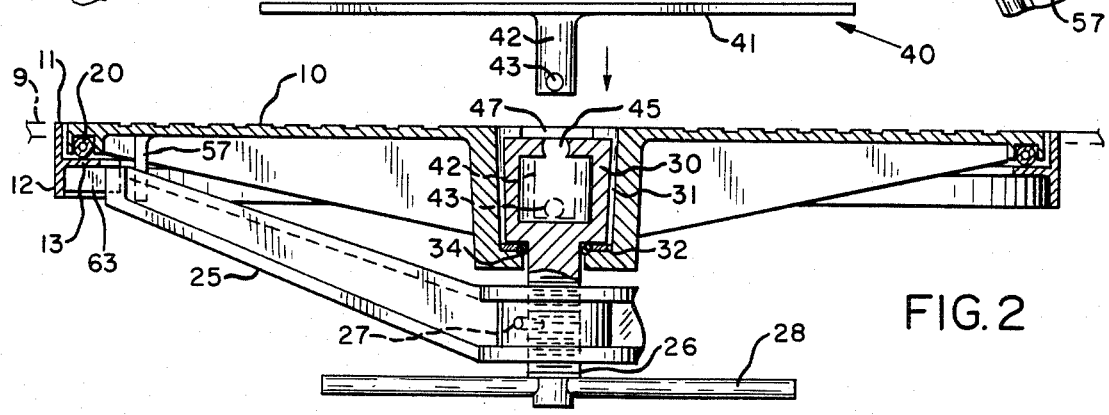

HATCH COVER

BACKGROUND OF THE INVENTION

This invention relates to certain improvements in the structures described and claimed in the Baier Pat. No. 3,209,663.

The purpose of the cover is to close a hatch, manhole or other such opening. In Baier, the cover is securely locked in place by a locking bar which is rotatable into locking position against the underside of a deck ring which receives the cover. The bar is clamped by a bolt passing through the cover and bar. Means are provided on opposite ends of the bolt for rotating it from either the outside or inside of the cover. A peripheral seal on the cover maintains a water tight and air tight joint when the cover is locked and clamped in place.

SUMMARY OF THE INVENTION

In the present form of construction the locking bar takes the form of a three-legged spider mounted on the center bolt. The ends of the legs on the spider engage an inner flange in an improved form of deck ring of T-shaped cross-section. An improved O-ring type of seal is contained in a peripheral vented groove in the underside of the cover to support the cover on the deck ring flange and also permit metal to metal contact between the cover plate and deck ring.

A new center bolt is designed to self-stow an external operating wrench when desired. This wrench can also be removed and stowed elsewhere. The center bolt has metal to metal contact with the cover plate through a washer while still retaining water tightness by the use of an O-ring around its shank.

The invention will be better understood and additional objects and advantages will become apparent from the following detailed description of the preferred embodiment illustrated on the accompanying drawing. Various changes may be made however in details of construction and arrangement of parts and all such modifications within the scope of the appended claim are included in the invention.

BRIEF DESCRIPTION OF THE DRAWINGS

In the drawing FIG. 1 is a top plan view of the hatch cover.

FIG. 2 is a sectional view taken on the line 2—2 in FIG. 1.

FIG. 3 is a fragmentary bottom plan view.

FIG. 4 is a sectional view taken on the line 4—4 in FIG. 1.

FIG. 5 is a sectional view taken on the line 5—5 in FIG. 1.

FIG. 6 is a sectional view taken on the line 6—6 in FIG. 1.

DESCRIPTION OF THE PREFERRED EMBODIMENT

The marginal portion of cover plate 10 is supported on deck ring 11 in a deck or road surface 9 as shown in FIGS. 2 and 4. Deck ring 11 is of T-shape in cross section having a continuous vertical wall 12 and continuous inwardly directed horizontal flange 13. Overlying the supporting flange 13 the underside of cover plate 10 has a gasket groove 14 formed by inner and outer vertical walls 15 and 16. Adjacent the underside of cover plate 10 these walls are provided with four pairs of interior and exterior vent openings 17 and 18 an the lower edges of these walls have confronting flanges 19 to retain a cylindrical gasket 20.

Gasket 20 is made of a resilient material such as synthetic rubber and is preferably tubular as shown although it may be solid, without the central opening. The diameter of gasket 20 is slightly less than the clearance space between vertical walls 15 and 16 and slightly greater than the clearance space between flanges 19 whereby these flanges retain the gasket in the groove 14.

Also, the diameter of gasket 20 exceeds the depth of groove 14, causing the gasket to protrude from the open underside of this groove to support the cover plate on deck ring flange 13 as shown. However, the open spaces between gasket 20 and the confining surfaces of groove 14 permit distortion of the gasket sufficiently to allow the lower edges of flanges 15 and 16 to seat directly on supporting ring flange 13 under a heavy load on the cover plate.

Cover plate 10 is retained and clamped in support ring 11 by a three-legged spider 25 mounted on a center bolt 26. The lower end of center bolt 26 has threaded engagement with the center of spider 25 and the latter is equipped with grease fitting 27 to lubricate the threads. The lower end of center bolt 26 is equipped with a cross bar 28 for rotating the center bolt.

The upper end of center bolt 26 has a hollow head 30 rotatable in a circular recess 31 in the top of the cover plate. The lower end of head 30 is seated on a washer 32 in the bottom of recess 31 and an O-ring gasket 34 provides a seal between the center bolt and recess 31.

Center bolt 26 may also be rotated by a removable external wrench 40 having a flat bar handle 41 with a stub shaft 42 at its center, the stub shaft having a radial pin 43 on its lower end. The top end of the hollow head 30 of center bolt 26 is provided with a double keyhole slot 45 whereby the center bolt may be rotated by the wrench when pin 43 is engaged in the keyhole slot. In this position the handle bar 41 is lifted above cover plate 10 so that the wrench may be freely rotated relative to the cover plate.

The wrench 40 may be removed as shown in FIG. 2 in solid lines or it may be stowed in the cover plate by dropping stub shaft 42 down to the bottom of the hollow head 30 as shown in broken lines. In the latter position the wrench is freely rotatable relative to center bolt 26 and cover plate 10 to deposit the handle bar 41 in a diametral groove 47 in the top of the cover plate as shown in FIG. 6. In FIG. 1 the stowed position of the wrench is indicated in broken lines.

Thus, in the stowed position the handle bar 41 is recessed into cover plate 10 and does not project above the cover plate. The ends of handle bar 41 project part way across a pair of hand hold recesses 50 in the cover plate for convenience in grasping and lifting the wrench 40. Each recess 50 is spanned by a grab handle 51 for lifting and rotating cover plate 10, the ends of wrench handle bar 41 resting on top of these grab handles when the wrench is in stowed postion.

Cover plate 10 is secured to supporting ring 11 by rotating the three ends of spider 25 under three inwardly projecting lips 55 on horizontal flange 13. A pair of stops 56 and 57 on the underside of the cover plate adjacent one arm of the spider 25 limits the rotation of the spider to a small angle as indicated by arrow 58 in FIG. 3. When the spider is rotated against stop 57 the cover plate is secured to support ring 11 and when the spider leg is rotated against stop 56 the cover plate is released.

When clamping pressure is not applied to spider 25 by center bolt 26 the spider is mormally rotated under or away from lips 55 by rotation of the center bolt 26 by handle bar 28 or wrench 40. If the spider fails to rotate with the center bolt, the cover plate 10 itself may be rotated causing stops 56 and 57 to rotate the spider.

In applying the cover plate 10 to support ring 11 the match mark 60 on the cover is positioned a distance to the left of match mark 61 on the ring and the cover is rotated in the direction of arrow 62 to bring the two match marks into register with each other as shown in FIG. 1. This puts a stop 63 on ring 11 at one edge of lip 55 opposite stop 57 on the cover as shown in FIG. 3 to insure that the spider arm cannot be rotated past ring lip 55. Arrow 65 in FIG. 3 corresponds to arrow 62 in FIG. 1. Then with the three spider arms positioned under the three ring lips 55 the spider is clamped tightly against these lips by rotating center bolt 26 by means of handle bar 28 or wrench 40.

In tightened position the cover plate 10 is normally supported on gasket 20 approximately as shown in FIG. 4. If the cover plate is subjected to a heavy load the gasket may distort into available open space in the gasket groove 14, as previously described, allowing the vertical groove walls 15 and 16 to seat on flange 13 in direct metal to metal contact without impairing the effectiveness of the seal.

The present form of deck ring 11 has superior strength parallel to its axis as well as transversly. This is of advantage in reinforcing the opening in which it is mounted. Also, there is less distortion in.hhe ring when the deck opening does not properly fit the ring.

What is claimed is:

1. A flush deck hatch or manhole construction having a cover with locking and clamping means, said construction comprising a supporting ring of T-shaped cross section having a continuous inwardly directed horizontal flange portion and a vertical portion extending above and below said flange, a cover plate having a peripheral gasket groove in its under side, overlying said flange portion of said supporting ring, said groove being formed by a pair of vertical walls on said cover plate having confronting horizontal flanges on their lower edges to retain a gasket in said groove between said walls, said walls having apertures in their upper portions to vent the groove on opposite lateral sides of said groove, and a resilient gasket in said groove having greater vertical thickness than the depth of the groove to support said cover plate on said horizontal flange portion of said supporting ring, the horizontal thickness of said gasket being greater than the space between said confronting horizontal flanges on said walls of said groove to retain the gasket in the groove and less than the width of the space between said walls of said groove to permit lateral expansion of said gasket in said groove and allow said vertical walls of the groove to seat on said flange portion of said supporting ring when said gasket is squeezed against said flange.

2. A construction as defined in claim 1, said gasket being circular in cross section.

3. A construction as defined in claim 2, said gasket being tubular.

4. A construction as defined in claim 1 including a handdle on the under side and a handle on the top side of said cover plate for clamping the cover plate to said supporting ring.

5. A construction as defined in claim 4, said top handle comprising a horizontal bar having a vertical stub shaft, said cover plate having a central recess to receive said stub shaft and a diametral recess to receive said horizontal bar for stowing said top handle.

6. A construction as defined in claim 5, said top handle being detachable from said cover.

7. A flush deck hatch or manhole construction comprising a supporting ring having a continuous inwardly directed flange, a cover plate having a peripheral gasket groove in its under side, a resilient gasket in said groove supporting said cover plate on said flange, clamping means on said cover plate operable from both inside and outside to compress said gasket against said flange, said flange underlying opposite side walls of said groove to seat said cover plate directly on said flange when said gasket is compressed, and air vent openings in opposite sides of said groove.

8. A construction as defined in claim 7, said clamping means operable from outside said cover plate comprising a removable wrench having a horizontal bar on a vertical stub shaft, said cover plate having a central recess to receive said stub shaft and a diametral recess to receive said horizontal bar for stowing said wrench.

9. A flush deck hatch or manhole construction comprising a supporting ring, a cover plate supported on said ring, a rotatable center bolt in said cover plate, a spider on the under side of said cover plate rotatable to engage under portions of said supporting ring for locking said cover plate to said supporting ring, said spider having screw thread engagement with said center bolt for clamping said cover plate to said ring, a handle on the under side of said cover plate for rotating said center bolt, a removable wrench on the upper side of said cover plate for rotating said center bolt, a stub shaft on said wrench received in said center bolt, a handle bar on said wrench received in a diametral groove in the top of said cover plate for stowing the handle, and hand access grooves extending from said handle bar groove.

10. A construction as defined in claim 9, said center bolt having an axial recess to receive said stub shaft on said wrench, a radial pin on said stub shaft rotatable in the bottom of said recess, and a keyhole slot in the top of said recess to engage said pin and rotate the center bolt when the wrench is lifted out of said diametral groove and rotated.

11. A construction as defined in claim 9 including an O-ring seal between said center bolt and cover plate.

12. A construction as defined in claim 9, said spider having three radial arms to engage and clamp said supporting ring in three places around the ring.

* * * * *